US007188527B2

(12) United States Patent
Jones et al.

(10) Patent No.: US 7,188,527 B2
(45) Date of Patent: Mar. 13, 2007

(54) APPARATUS AND METHOD FOR VIBRATION ANALYSIS OF A MACHINE OR OTHER ARTICLE

(75) Inventors: Barbara L. Jones, Norfolk (GB); Paul Smith, Norfolk (GB)

(73) Assignee: Snap-on Equipment Limited, King's Lynn (GB)

( * ) Notice: Subject to any disclaimer, the term of this patent is extended or adjusted under 35 U.S.C. 154(b) by 481 days.

(21) Appl. No.: 10/884,736

(22) Filed: Jul. 2, 2004

(65) Prior Publication Data

US 2004/0239516 A1 Dec. 2, 2004

Related U.S. Application Data

(62) Division of application No. 09/402,262, filed as application No. PCT/GB98/00866 on Apr. 3, 1998, now Pat. No. 6,917,304.

(30) Foreign Application Priority Data

Apr. 3, 1997 (GB) ................................ 9706797.9

(51) Int. Cl.
*G01N 29/04* (2006.01)

(52) U.S. Cl. ........................... 73/660; 73/661; 340/683

(58) Field of Classification Search .................. 73/602, 73/660, 661; 367/127; 340/683
See application file for complete search history.

(56) References Cited

U.S. PATENT DOCUMENTS

| | | | |
|---|---|---|---|
| 4,738,133 | A | 4/1988 | Breckel et al. |
| 4,787,053 | A | 11/1988 | Moore |
| 4,831,558 | A | 5/1989 | Shoup et al. |
| 4,831,560 | A | 5/1989 | Zaleski |
| 5,070,536 | A | 12/1991 | Mahany et al. |
| 5,132,968 | A | 7/1992 | Cephus |
| 5,193,000 | A | 3/1993 | Lipton et al. |
| 5,260,944 | A | 11/1993 | Tomabechi |
| 5,345,599 | A | 9/1994 | Paulraj et al. |
| 5,363,370 | A | 11/1994 | Abiven |
| 5,446,735 | A | 8/1995 | Tobagi et al. |
| 5,448,759 | A | 9/1995 | Krebs et al. |
| 5,481,481 | A | 1/1996 | Frey et al. |
| 5,509,013 | A | 4/1996 | Adachi et al. |
| 5,515,378 | A | 5/1996 | Roy, III et al. |

(Continued)

FOREIGN PATENT DOCUMENTS

| | | |
|---|---|---|
| AU | 18143 | 12/1988 |

(Continued)

*Primary Examiner*—John E. Chapman
(74) *Attorney, Agent, or Firm*—Seyfarth Shaw LLP

(57) ABSTRACT

A method and apparatus for wireless transmission of data through a communications channel between at least two local data sensors (for example automotive diagnostic data sensors or NVH sensors), which may include a primary data-processing function, and data-processing function (for example a PC) to receive data therefrom. The system provides for asymmetrical division of the communications channel on a frequency or time-division or packet-switching basis so that the corresponding asymmetrical data transmission requirement of the local data sensors are matched to the capacity of their respective sub-channels whereby a single channel is capable of transmitting all the required data. A particularly practical application is to noise vibration harshness analysis of wireless-transmitted data from three-dimensionally spaced NVH sensors enabling spacial pinpointing of vibration sources in automotive warranty analysis studies.

2 Claims, 4 Drawing Sheets

U.S. PATENT DOCUMENTS

| | | | | |
|---|---|---|---|---|
| 5,528,507 | A | 6/1996 | McNamara et al. | |
| 5,541,840 | A | 7/1996 | Gurne et al. | |
| 5,544,073 | A | 8/1996 | Piety et al. | |
| 5,602,749 | A | 2/1997 | Vosburgh | |
| 5,622,170 | A | 4/1997 | Schulz | |
| 5,642,353 | A | 6/1997 | Roy, III et al. | |
| 6,466,134 | B1 * | 10/2002 | Ahearn | 340/683 |
| 6,925,879 | B2 * | 8/2005 | Raichle | 73/579 |

FOREIGN PATENT DOCUMENTS

| | | |
|---|---|---|
| DE | 4106572 | 9/1992 |
| DE | 4131341 | 11/1992 |
| EP | 268492 | 5/1988 |
| EP | 483549 | 5/1992 |
| EP | 515728 | 12/1992 |
| EP | 685390 | 12/1995 |
| GB | 2295070 | 5/1996 |
| WO | WO 9809522 | 10/1989 |

* cited by examiner

APPARATUS AND METHOD FOR VIBRATION ANALYSIS OF A MACHINE OR OTHER ARTICLE

REFERENCE TO RELATED APPLICATIONS

This application is a division of U.S. application Ser. No. 09/402,262, filed Feb. 28, 2000, now U.S. Pat. No. 6,917,304, which is a national stage application based on International application no. PCT/GB/98/00866, filed Apr. 3, 1998 which, in turn, claims the benefit of the priority date of United Kingdom application no. 9706797.9, filed Apr. 3, 1997.

This invention relates to a method and apparatus for wireless transmission of data through a communications channel comprising at least two local data sensors and a data processing function to receive data from the local sensors. A non-limiting example of the application of the method is in the field of automotive diagnostic equipment and related automotive service equipment. A particularly practical application of the invention is to noise vibration harshness (NVH) analysis of automotive and other machines to enable two or three-dimensional location pinpointing of vibration sources, for example in automotive warranty investigations and indeed in many other machine applications. Further examples of the application of the invention arise in relation to business operations for the wireless transmission of data, for example, across a room.

The invention also provides a method and apparatus for vibrational analysis of a machine or other article permitting three-dimensional positional co-ordinate identification of a source of vibration.

In this specification and the claims, references to local data sensors are to be interpreted in accordance with the following, namely that the sensors may transmit raw data for subsequent processing or one or more of these may incorporate some degree of primary data processing whereby the data received at the main processor is partially or totally pre-processed or indeed raw data.

In the field of automotive diagnostics and servicing there has been for a good many years a requirement for a step forward in terms of the transmission of diagnostic and servicing data from data sensors to a data processing function which operates to analyse and/or display the corresponding data for use by a person carrying out servicing and/or diagnostic functions on a motor vehicle. Conventionally, the data is transmitted from the data sensors to the data processing function via conventional conductors or cables which impose obvious inconveniences and limitations on the convenient operation of the equipment. Attempts have been made to reduce these drawbacks in several ways. Firstly, various proposals have been made to simplify the use of cable connectors as such. For example, one proposal in this regard provides for a system in which a boom-mounted data-handling sub-unit is conveniently manoeuvrable to a location close to the automotive sensors and is thus linked to them by relatively short cable connections. This arrangement undoubtedly does reduce somewhat the inconvenience of the cable connection systems but by no means eliminates it.

Various attempts have been made to achieve effective wireless transmission of data between automotive data sensors and a corresponding data-processing and/or display function but these have been relatively unsuccessful. The main shortcoming of such prior proposals has been the sheer volume of data, and the composite nature of the data (such as a mixture of data types eg digital and analogue). A further factor among the shortcomings of these prior proposals is also the composite nature of the data bandwidths to be transmitted. Such data needs to be transmitted and has conventionally been handled by a harness of 12 or more conduction cables. By adopting conventional wireless transmission systems for such data communication there is immediately a problem of excessive bandwidth requirements arising from the fact that some at least of the data sensors for this automotive application produce high data rates necessitating corresponding band widths to accommodate them. This does not apply to all the sensors. Comparable considerations apply to certain business applications where data is transmitted across a room or other relatively short transmission route.

Accordingly, we have identified a requirement for a method and apparatus for the wireless transmission of data through a communications channel from at least two local data sensors with optional primary data processing, to a data processing function, offering improvements in relation to prior proposals in this field, notably in relation to the bandwidth requirement and/or related functions attendant on the simultaneous transmission of data from a multiplicity of such local sensors.

There is disclosed in EP 0 483 549A2 (IBM CORP) a control method and apparatus for a wireless data link, for example, from a handheld workstation which is bidirectionally coupled to a base station through an infrared carrier. A robust control channel is provided separate from a data channel. The modulators employ on/off pulsing, multi-carrier modulation or direct sequence spread spectrum (DSSS) modulation. Each mobile unit is assigned an identifier or address and the system claims to overcome the problem of establishing and maintaining high bandwidth communication by separating the control channel from the data channel whereby the control channel bandwidths can be made significantly smaller.

In WO 89/09522 there is disclosed a method for allocating bandwidths in a broadband packet switching network using a set of parallel packet channels that act as a single data link connection between packet switches. Bandwidth is initially allocated to particular channel groups (at initial circuit set-up times) and to individual channels within the groups (at transmission times) so as to increase throughput and reduce packet loss. For bursty traffic, the use of channel groups reduces the packet loss by several orders of magnitude.

EP 0 515 728A2 relates to a wireless indoor relay system. AU-A-18143/88 relates to a wireless data transmission link and notably a protocol for establishing a duplex link between first and second data link devices.

Other known references include:

GB 2295070

EP 0483549

EP 0268492

U.S. Pat. No. 5,509,013

U.S. Pat. No. 5,448,759

U.S. Pat. No. 5,363,370

According to the invention there is provided a method and apparatus for wireless transmission of data through a communications channel between at least two local data sensors with optional primary data processing and a data processing function, as defined in the accompanying claims.

In a described embodiment, there is provided a method and apparatus in which the step of multiplexing division of the communications channel is effected asymmetrically, whereby the data carrying capacities of the sub-channels are unequal. Likewise in the embodiment, the data rates required for data transmission from the local sensors differs substantially between the at least two sensors. Likewise also in the embodiment, the step of allocating data from the local data sensors to the data transmission sub-channels is effected in accordance with the data-carrying capacities of these sub-channels. In this way there is achieved within a communications channel, the economical use of the available bandwidth whereby the allocation of bandwidth corresponds with the band width requirements of the individual data sensors. Thus, in the case of a sensor sensing data relating to ignition events which occur at a relatively high speed and thus require a corresponding significant allocation of bandwidth for satisfactory transmission, such is provided, whereas in the case of a sensor sensing alternator voltage (to take a simple example) the required that transmission rate is smaller by many orders of magnitude and likewise the corresponding bandwidth requirements.

Whereas prior proposals in relation to data transmission for automotive and related systems (in which data sensors produce substantially differing data rates) have ignored or overlooked these differing data rate requirements, with the result that the use of equal bandwidth sub-channels has led to a non-utilisation of sub-channel bandwidths for significant numbers of sensors whereby the overall utilisation of data transmission capacity allocated to the communications system has been very far from perfect.

In accordance with the embodiments of the invention, the use of a system in which data is fed via a "multiplexing" control system which allocates data to sub-channels in accordance with the actual data rate requirement of the individual data flow, each such data flow is thereby far more closely matched to the available capacity of its sub-channel and the twin evils of sub-channel under-utilisation and under-capacity (for a given data flow) are thereby avoided.

In one significant embodiment, the multiplex control system divides the communications channel on a frequency basis and allocates the data streams from the sensors to the frequency sub-channels accordingly.

In another important embodiment, the multiplexing control system divides the data communication channel on a time-division basis and likewise divides the data streams accordingly.

The reference above to "multiplexing" has been adopted to draw attention to the fact that references in this specification and in the claims to "multiplexing" are intended not to be limited strictly to non time-overlap or signal-chopping systems (such as would be obtained with a distinct signal-chopping technique). The term "multiplexing" in this description and the claims includes the provision of multiplexing systems which are adapted to effect multiplexing on an interdigitated and non-chopping data-allocation basis in which a degree of data element transmission time-overlap between channels is permitted. The data allocation systems for data-division between available channels can be readily designed accordingly by the technically skilled person so as to, in this way, more readily meet the technical parameters imposed on the system, as described below.

In a yet further embodiment, the multiplexing system achieves its channel division on a packet-switching basis and the interleaved data packets are distributed on an unsymmetrical basis.

In the embodiment, there is provided a radio frequency data rate of 1 to 4 Mb (megabits) per second. The multi-channel system can accommodate the requirements eg for the transmission of data for operating an oscilloscope system for engine analysis.

While the described embodiments utilise radio frequency transmission, the principles of the invention may well be applicable outside radio frequencies.

An important aspect of the invention relates to vibrational analysis of machines and other articles and products and systems. In accordance with this aspect of the invention a vibration sensor, for example an NVH (noise vibration harshness) sensor is utilised to three-dimensionally locate a source of vibration in a machine or system. Such a sensor may be just one of the local sensors in the wireless transmission system of the other embodiments, or it may be provided with its own cable or other transmission channel for its vibration signals.

In order to three-dimensionally locate a source of vibration, the vibration signals are monitored at three or more positionally-defined locations of the sensor. In the preferred embodiment the sensor is provided with its own three-dimensional location or co-ordinate-defining system (utilising spaced infrared sensors), so that the sensor's location at any given time is readily defined. Alternatively, the sensor may be caused to sense at three known locations, or three sensors may be provided, one each at three such locations.

Embodiments of the invention will now be described by way of example with reference to the accompanying drawings in which.

Figure 1:
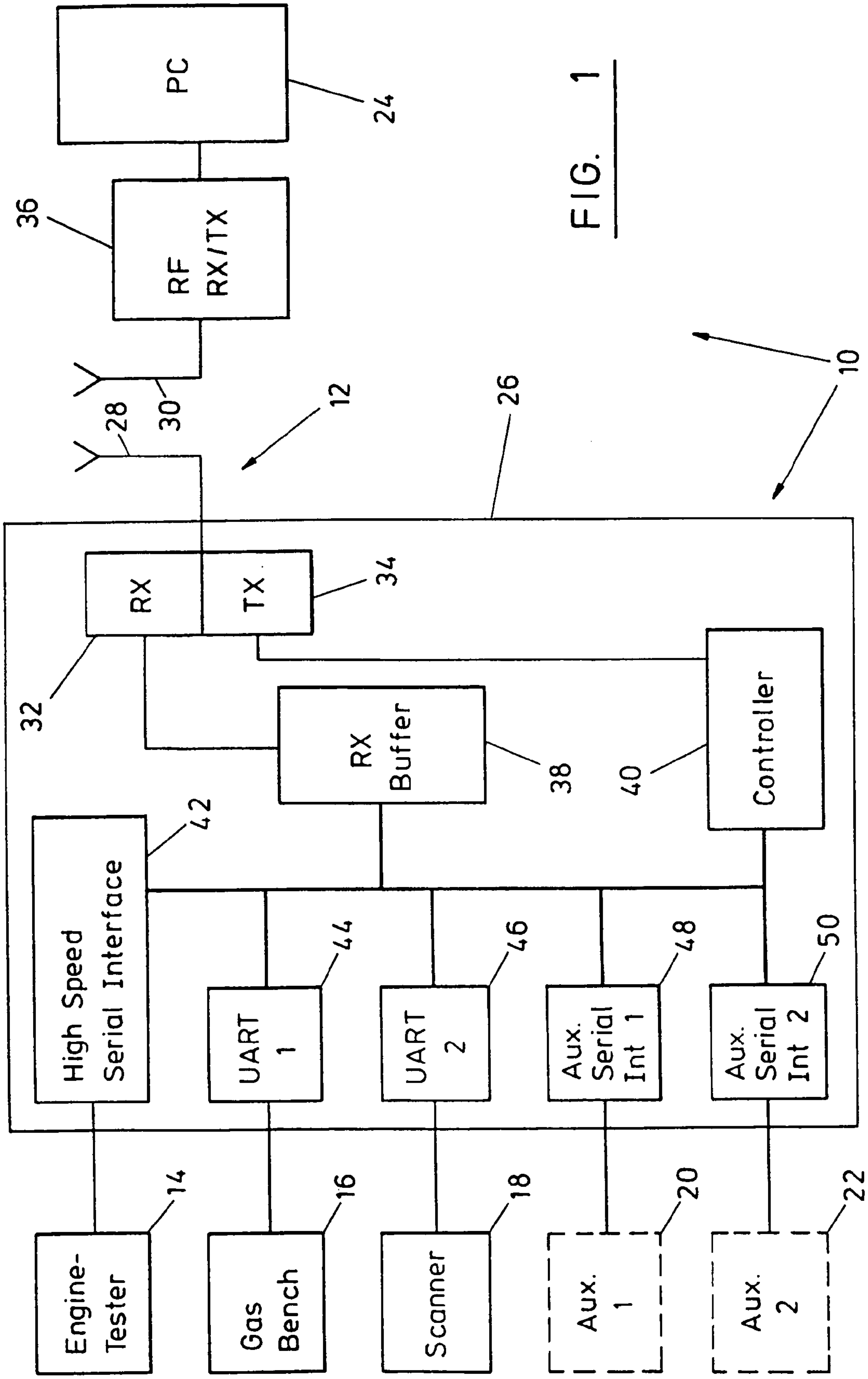
FIG. 1 shows a functionality block diagram for a high speed RF data link, including both the frequency multiplexing system (of FIGS. 2 and 3) and the time-division multiplexing system (of FIGS. 4 and 5 hereof)
Figure 4:
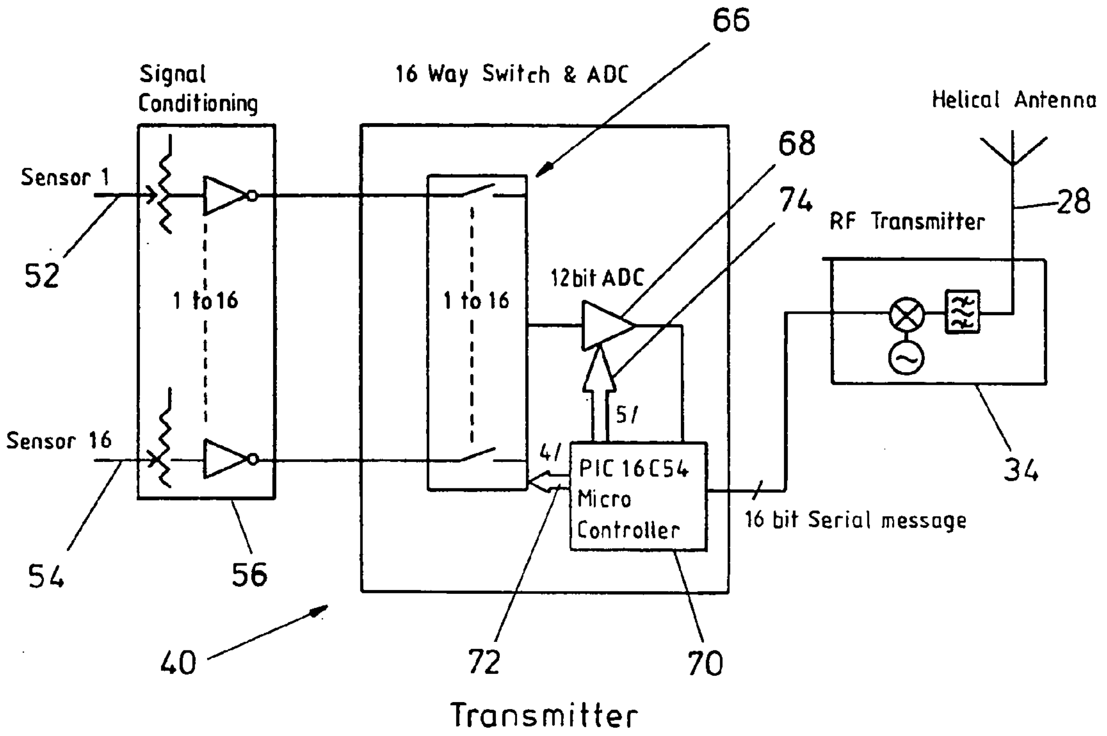
Figure 5:
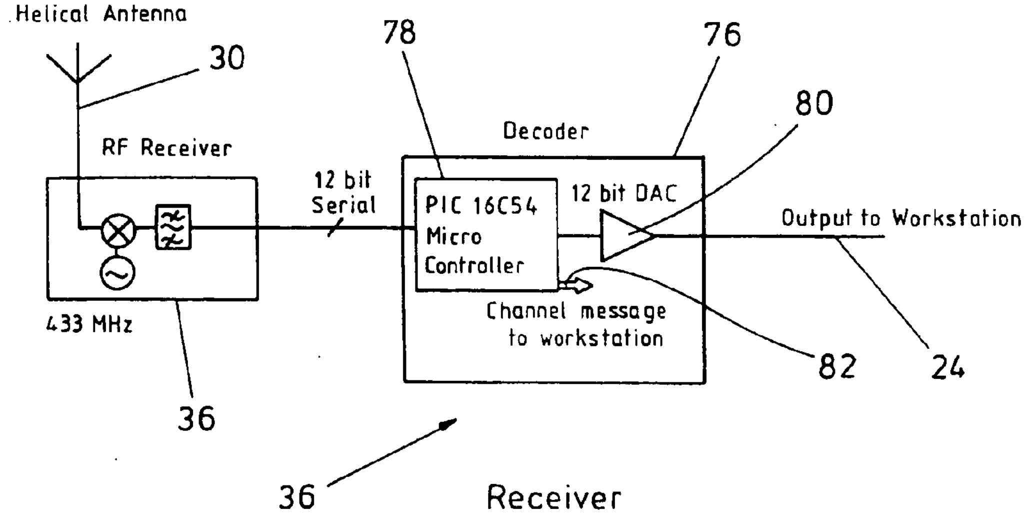
Figure 6:
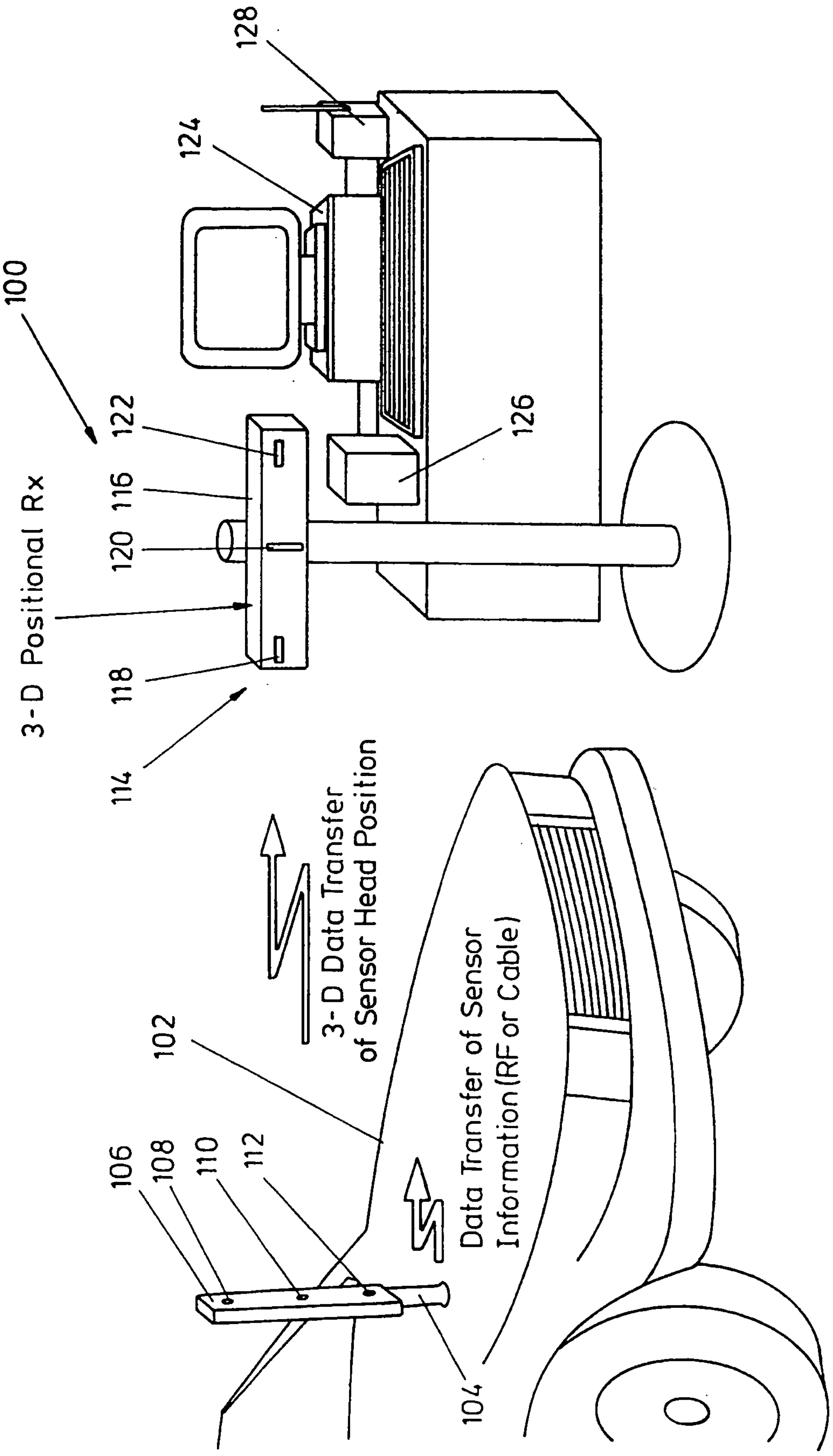

FIGS. 4 and 5 show block diagrams of the transmitter and receiver functions of the system of FIG. 1 as they apply to a time-division multiplexing system; and FIG. 6 shows a three-dimensional representation of a further embodiment in which a local vibration sensor has its own three-dimensional imaging or location system whereby the single sensor can rapidly positionally locate a source of vibration.

As shown in FIG. 1, a system 10 for wireless transmission of data through a communications channel 12 between local data sensors 14, 16, 18, 20 and 22, and a data-processing function or personal computer 24, to receive data therefrom, comprises the following main elements.

Firstly, as regards the local data sensors 14 to 22, as shown these comprise an engine tester 14, a gas bench 16, a scanner 18 and auxiliary sensors indicated as Aux 1 and Aux 2. These sensors are intended to be representative of the entire range of automotive sensors which are currently utilised for diagnostic and servicing processes, including for example vibration sensors (for RPM testing) ignition and alternator ripple sensors (likewise for RPM measurement), emissions analysis sensors, battery analysis sensors and the like.

Indicated at 26 is the remote receive/transmit unit to which the individual sensors 14 to 22 are connected. The duplex (transmit/receive) operating characteristics of this unit arise from the need for the return transmission of data from the data processing function 24 for set-up purposes.

Broadly, the system comprises antennae 28, 30 connected to receive/transmit functions 32 and 34 within remote unit 26. Likewise, a receive/transmit unit or function 36 is provided for PC 24. A receive buffer 38 and a controller 40 serve to interconnect the transmit and receive functions 34, 32 to a series of RS-232 interfaces 42 to 50, each connected to its respective one of the local sensors 14 to 22.

Interfaces 42, 44, 46, 48 and 50 are serial interfaces providing for serial communication between the sensor and the receive/transmit function 32, 34 via buffer 38 and controller 40. Interface 42 is a high speed serial interface. Interfaces 44, 46, 48 and 50 are RS-232 interfaces. Interfaces 44, 46 are designated in FIG. 1 as "UART1" and "UART2", referring to their function as universal asynchronous receiver/transmitter devices (or interfaces) for serial transmission of data. Receive buffer 38 and controller 40 provide data processing functions relevant to the inflow and outflow of data for the duplex operating characteristics of system 10 as will be more fully described below in relation to FIGS. 2, 3, 4 and 5. Accordingly, the details of these aspects of the system 10 will now be described further with reference to FIGS. 2, 3, 4 and 5.

Figure 2:
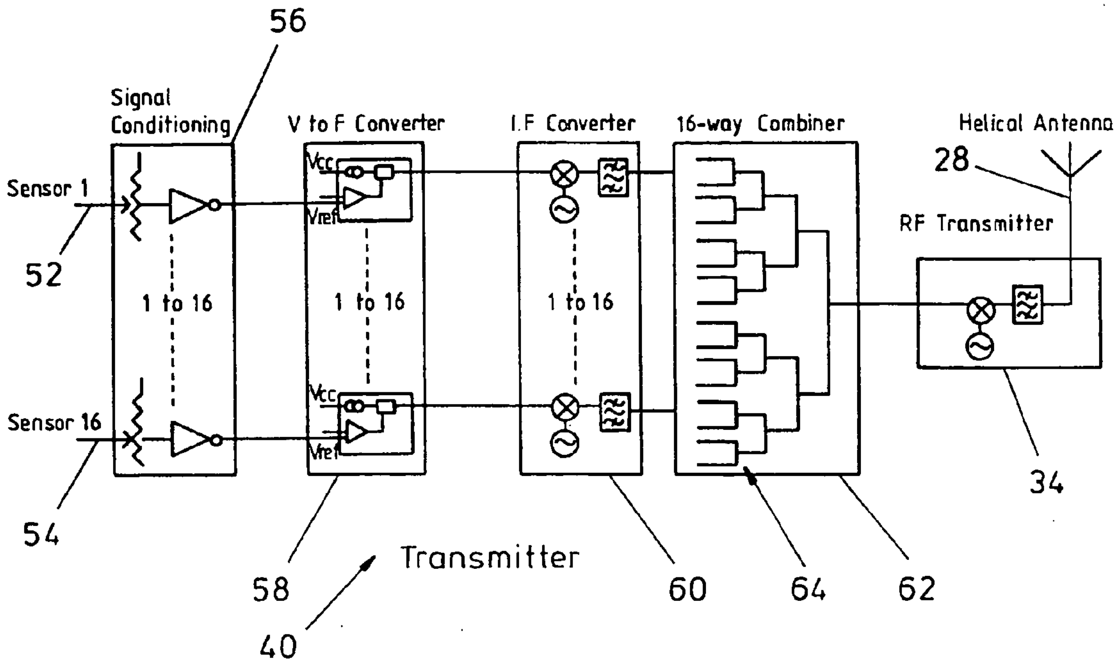
FIGS. 2 and 3 show block diagrams of the transmitter and receiver functions of the system of FIG. 1 as it applies to a frequency multiplexing system.
Figure 3:
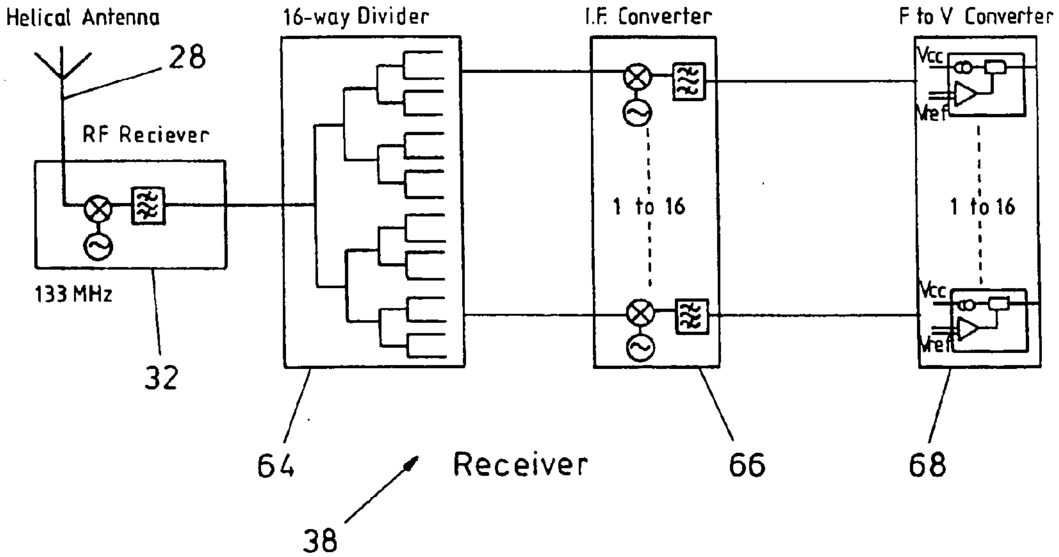

As shown in FIGS. 2 and 3, the RX buffer 38 and controller 40 provide data processing/signal conditioning functions to be more fully described below.

As shown in FIG. 2, inputs from the individual sensors 14 to 22 are indicated at 52 and 54 which are marked "Sensor 1" and "Sensor 16" to indicate that the system can accommodate 16 individual inputs.

The main function of controller 40 is to provide a multiplexing function whereby communication channel 12 is divided into 16 sub-channels on a frequency basis; these channels being of unequal band width and being allocated according to band width (more band width for greater band width requirement) to the individual data channels 1 to 16.

Interfaces 42 to 50 in FIG. 1 provide the signal conditioning function indicated in FIG. 2 at 56. The functions of controller 40 are shown as divided into functions 58, 60 and 62, namely voltage frequency conversion, secondary (low frequency) frequency conversion and sub-channel combination respectively. Each function operates in relation to all 16 sub-channels.

The sub-channel combination function at 62 produces a serial data stream which is fed to the RF transmitter function 34 and thus to the helical or other suitable antenna 28.

A further function of controller 40 is to append the relevant sub-channel number to each sub-channel of raw data so that this data stream can be routed to the relevant virtual serial port of PC 24 after radio transmission between antennae 28 and 30.

In this embodiment, the multiplexing sub-division of the data communication channel is provided on a frequency basis, whereas in the embodiment of FIG. 4 the multiplexing is effected on a time-division basis.

As shown in FIG. 3, RX buffer 38 provides the related inverse functions for signals received via antenna 28 and receiver functions 32. These functions are indicated at 64 and 66 and 68 and correspond, respectively, with the functions 62, 60 and 58 respectively in FIG. 2. No further description is therefore deemed necessary.

In operation, data from sensor 14 to 22 (or indeed from the 16 sensors indicated in FIG. 2) is processed in accordance with the functions 56, 58, 60 and 62 as shown in FIG. 2. The data streams are allocated to the 16 sub-channels indicated diagrammatically at 64 in FIG. 2. The allocation is effected in accordance with the known data rate requirements of the individual sensors, according to their known uses. In general terms, the band width of each sub-channel is matched to comfortably accommodate the data rate requirements of its respective data stream, but without the over-provision which tends to occur in certain cases with conventional use of conventional data transmission equipment.

Turning now to the time-division embodiment of FIG. 4, parts corresponding to those described above in relation to FIGS. 2 and 3 are numbered accordingly in FIG. 4.

In FIG. 4, the signal conditioning function 56 corresponds to that provided by the serial interfaces 42 to 50 in FIG. 1. However, in this embodiment the controller function 40 differs from that of FIG. 2 in being a time-division based function (utilising a 16-way switch function 66 to provide the time-based multiplexing function corresponding to the frequency-based multiplexing of FIGS. 2 and 3). A 12 bit analogue-to-digital conversion function 68 processes data from switch function 66 and is linked to a microcontroller 70 (an asynchronous PIC 16C54 communications element) coupled to RF transmitter 34. Microcontroller 70 provides at 72 a control signal to switch 66 in accordance with the time-based multiplexing function which controls the sub-channel data capacities in accordance with the required data rates of the sensor input. A related control function 74 is provided to ADC converter 68.

As shown in FIG. 5, the data processing function 24 in FIG. 1 receives data via antenna 30 and receiver 36 through a decoding function 76 shown in FIG. 5 and comprising a microcontroller 78 corresponding to microcontroller 70 which feeds data via a digital-to-analogue converter 80 to workstation of PC 24. The microcontroller 78 produces a channel message 82 for the workstation enabling same to allocate the decoded data stream to respective virtual serial ports set up in the PC for data analysis and display purposes.

This embodiment allocates data streams to respective data channels on the same principle described above but on a time-division basis instead of a frequency-division basis.

In a further embodiment, not shown, in which a packet-switching data transmission technique is employed, the allocation of data streams to packets is effected asynchronously in accordance with the matching of data rate to sub-channel capacity discussed above, thereby producing the corresponding asymmetrical interleaving of the data packets.

In the frequency-multiplexed embodiment of FIGS. 2 and 3, a modification may be employed whereby spread spectrum frequency division is utilised thereby reducing or eliminating the requirement to label the sub-channels by means of identifying data.

Amongst other modifications which could be made in the above embodiment are the following. Firstly, it is to be understood that the local sensors may be adapted to produce analogue signals or digital signals. Usually, analogue signals will be produced and conversion to digital will be effected in the data-processing stage. Nevertheless, it may be beneficial for certain applications or in the future to employ sensors producing digital signals, and in some cases both digital and analogue-type sensors could be employed, these transmitting their data through their respective sub-channels. Secondly, it is to be understood that while the invention has been discussed and defined by reference to specific sub-channels and the allocation of data from sensors to respective ones of these, it is to be understood that a sensor producing a high data-rate may for that purpose have allocated to it a number of sub-channels or thus a group of sub-channels accordingly.

Turning now to the embodiment of FIG. 6, this shows a system 100 for vibrational analysis of an automotive vehicle 102 to enable three-dimensional location or co-ordinate-identification of a source of vibration. Thus, the apparatus of FIG. 6 may be employed for rapidly enabling location of squeaks or rattles or more serious vibrational symptoms.

For this purpose there is provided a local vibration sensor 104 which forms one local sensor of an embodiment of the invention described above and thus is provided with a link (not shown) to the wireless transmission system of the preceding embodiments. Alternatively, the sensor 104 may be provided with its own dedicated vibrational analysis system (not shown) in the case where it is desired to use it as a stand-alone system.

Incorporated as part of the local vibration sensor unit 104 is a three-dimensional location positional transmitter 106 having three spaced-apart infra-red light emitting diodes (LEDs) 108, 110, 112.

Transmitter 106 forms part of a three-dimensional optical localisation system 114. Such systems are available from Image Guided Technologies Inc of Boulder, Colo., USA. Technology of this kind is described in U.S. Pat. No. 5,622,170 (Schulz/Image Guided Technologies Inc).

System 114 comprises a moveable three-dimensional positional receiver 116 having infra-red LEDs 118, 120, 122 adapted to communicate with the LEDs 108, 110, 112. Receiver 116 communicates with personal computer 124 and with a positional interface 126 and a sensor interface 128, performing decoding functions.

The three-dimensional optical localisation system 114 enables the co-ordinate location of vibration sensor 104 at any given time to be readily identified.

As a result, the single sensor 104 can be monitored at three or more locations while its vibration signals are likewise monitored in accordance with the procedures of the preceding embodiments, enabling the source of a vibration signal within vehicle 102 to be identified in terms of its co-ordinate location.

The invention claimed is:

1. A method for vibration analysis of a machine or other article comprising:

a) providing a vibration sensor (104);

b) causing said sensor to sense to sense vibrations;

c) analyzing signals produced by said sensor;

characterized by d) providing said sensor with three-dimensional location sensing means (106);

e) causing said vibration sensor to be mechanically coupled to the machine or other article to sense vibrations at three-dimensionally-spaced locations and using said three-dimensional location sensing means to determine the co-ordinates of said three locations; and f) identifying the location or co-ordinates of a source of vibration accordingly.

2. Apparatus for vibration analysis of a machine or other article comprising:

a) a vibration sensor (104) adapted to sense vibrations at chosen locations; and b) analysis means (124) adapted to analyze signals produced by said sensor; characterized by c) said vibration sensor being adapted to be mechanically coupled to the machine or other article and further comprising three-dimensional location sensing means (106);

d) whereby said single sensor can be caused to sense vibrations at three-dimensionally spaced locations at which said three-dimensional location sensing means can identify the co-ordinate locations thereof whereby the corresponding co-ordinates of a source of vibration can be determined.

* * * * *